United States Patent
Abele et al.

(10) Patent No.: US 8,280,587 B2
(45) Date of Patent: Oct. 2, 2012

(54) METHOD AND APPARATUS FOR OPERATING A VEHICLE

(75) Inventors: Andreas Abele, Barbing (DE); Jens Fiedler, Thalmassing (DE); Matthias Kretschmann, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 428 days.

(21) Appl. No.: 12/376,676

(22) PCT Filed: May 30, 2007

(86) PCT No.: PCT/EP2007/055245
§ 371 (c)(1),
(2), (4) Date: Jun. 1, 2010

(87) PCT Pub. No.: WO2008/017527
PCT Pub. Date: Feb. 14, 2008

(65) Prior Publication Data
US 2010/0235036 A1   Sep. 16, 2010

(30) Foreign Application Priority Data

Aug. 10, 2006  (DE) .......................... 10 2006 037 531

(51) Int. Cl.
  *B62D 11/00*  (2006.01)
  *G06F 7/00*  (2006.01)
(52) U.S. Cl. ......................................... 701/41; 701/31.4
(58) Field of Classification Search ........................ None
  See application file for complete search history.

(56) References Cited

U.S. PATENT DOCUMENTS

| | | | |
|---|---|---|---|
| 4,827,416 A * | 5/1989 | Kawagoe et al. | 701/38 |
| 5,388,658 A | 2/1995 | Ando | |
| 5,583,483 A | 12/1996 | Baumann | |
| 5,614,882 A | 3/1997 | Latarnik et al. | |
| 5,682,333 A | 10/1997 | Baumann | |
| 5,802,491 A | 9/1998 | Bush | |
| 5,929,329 A | 7/1999 | Burkhard et al. | |
| 6,611,781 B1 | 8/2003 | Gutmann | |
| 6,644,105 B2 | 11/2003 | Dieckmann et al. | |
| 2001/0054310 A1 | 12/2001 | Dieckmann et al. | |
| 2004/0172181 A1 | 9/2004 | Lu | |
| 2005/0209752 A1* | 9/2005 | Ono et al. | 701/41 |
| 2005/0216157 A1* | 9/2005 | Sakata | 701/42 |
| 2005/0288842 A1 | 12/2005 | Brewer | |
| 2008/0133066 A1* | 6/2008 | Takenaka | 701/1 |

FOREIGN PATENT DOCUMENTS

DE   4327491 A1   2/1995

(Continued)

OTHER PUBLICATIONS

Japanese Office Action, Japanese Patent Application No. 2009-523216, 29 pages, Dec. 5, 2011.

*Primary Examiner* — Faris Almatrahi
(74) *Attorney, Agent, or Firm* — King & Spalding L.L.P.

(57) ABSTRACT

In a method for operating a vehicle (1) having a plurality of wheels (3) and wheel sensors (5) which are associated with said wheels and whose measurement signals are representative of angular speeds of the respective wheels (3), respective scaling values (SV1, SV2, SH1, SH2) are adapted when a predefined condition is met, the condition depending on the yaw rate (GR) of the vehicle and/or on the steering angle (LW) of the front/rear wheels.

20 Claims, 3 Drawing Sheets

FOREIGN PATENT DOCUMENTS

| | | | |
|---|---|---|---|
| DE | 4327492 C1 | 2/1995 |
| DE | 4337443 A1 | 5/1995 |
| DE | 4426960 A1 | 2/1996 |
| DE | 19936710 A1 | 2/2001 |
| EP | 1155879 A2 | 11/2001 |
| EP | 1167086 A | 1/2002 |
| GB | 2398846 A | 9/2004 |
| JP | 4121439 A | 4/1992 |
| JP | 4306174 A | 10/1992 |
| JP | 2001260855 A | 9/2001 |

* cited by examiner

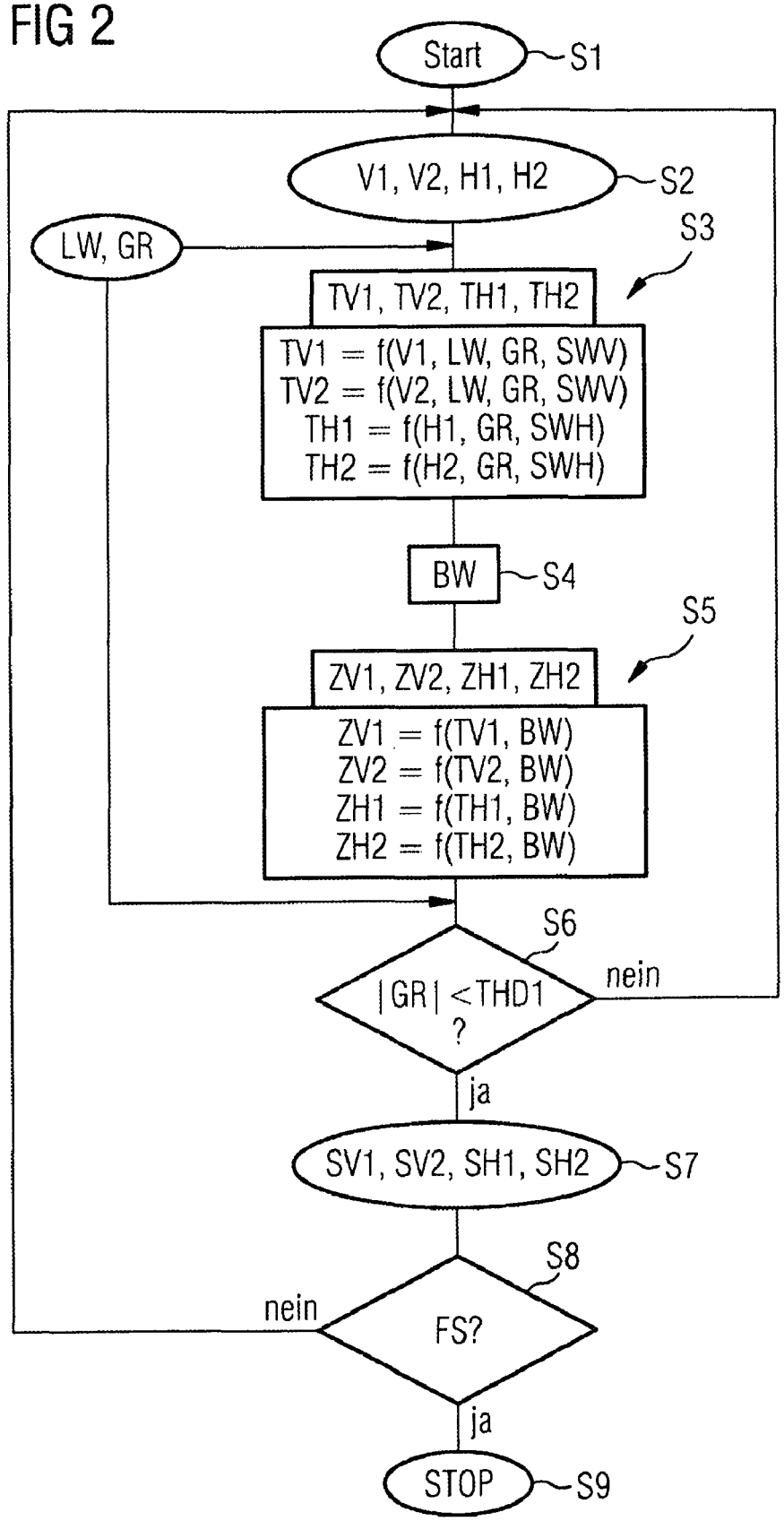

METHOD AND APPARATUS FOR OPERATING A VEHICLE

CROSS-REFERENCE TO RELATED APPLICATIONS

This application is a U.S. National Stage Application of International Application No. PCT/EP2007/055245 filed May 30, 2007, which designates the United States of America, and claims priority to German Patent Application No. 10 2006 037 531.9 filed Aug. 10, 2006. The contents of these applications are incorporated herein in their entirety by this reference.

TECHNICAL FIELD

The invention relates to a method and an apparatus for operating a vehicle having a plurality of wheels and wheel sensors which are associated with said wheels and whose measurement signals are representative of angular speeds of the respective wheels.

BACKGROUND

The handling of a vehicle is determined on the basis of vehicle parameters such as steering wheel angle, transverse acceleration, longitudinal acceleration or longitudinal deceleration, or yaw rate (rate of rotation around the vertical axis of the vehicle). In order to clarify a certain vehicle handling, for example vehicle stability in different environmental conditions, further vehicle parameters—such as longitudinal speed and steering angle of the front and/or rear wheels—are registered.

The longitudinal speed of the vehicle is the component of the vehicle speed in the direction of the longitudinal axis of the vehicle. The vehicle speed is determined wherein the number of revolutions of the wheels of the vehicle is registered. The longitudinal speed of the vehicle is one of the greatest influences on vehicle stability and is one of the most important vehicular parameters of the vehicle.

SUMMARY

According to various embodiments, a method and an apparatus for operating a vehicle having a plurality of wheels can be created, and which enable the vehicle to be operated.

According to an embodiment, a method for operating a vehicle having a plurality of wheels and wheel sensors which are associated with said wheels and whose measurement signals are representative of angular speeds of the respective wheels, may comprise the following: —respective characteristic values are registered for the angular speed of the respective wheel depending on the respective measurement signals, —the characteristic values in a common reference coordinates system of the vehicle are transformed depending on at least one of steering angle or yaw rate, —a common reference value is determined depending on the transformed characteristic values, —respective intermediate scaling values are determined depending on the respective ratio of the transformed characteristic values and the reference value, —respective scaling values are adapted depending on the intermediate scaling values when a predefined condition, which is dependent upon the yaw rate and/or upon the steering angle, is met.

According to a further embodiment, the respective scaling values, depending on the respective intermediate scaling values, may be subject to greater adaptation at the time of a vehicle start-up than after a predefined period following the vehicle start-up. According to a further embodiment, the transformed characteristic values for the angular speed of the respective wheel may be low-pass filtered and the common reference value may be determined depending on the low-pass filtered, transformed characteristic values. According to a further embodiment, the common reference values may be low-pass filtered and respective intermediate scaling values may be determined depending on the respective ratio of the transformed characteristic values for the angular speed of the respective wheel and of the low-pass filtered reference value. According to a further embodiment, the common reference values can be low-pass filtered and respective intermediate scaling values can be determined depending on the respective ratio of the low-pass filtered, transformed characteristic values and of the low-pass filtered reference value. According to a further embodiment, the reference coordinates system of the vehicle may be a barycentric coordinates system of the vehicle. According to a further embodiment, the predefined condition may be met when the yaw rate of the vehicle is lower than a predefined first threshold value. According to a further embodiment, the predefined conditions may be met when the steering angle of the vehicle is lower than a predefined second threshold value. According to a further embodiment, a scaled wheel speed may be determined depending on the respective scaling value and on the assigned characteristic value for the angular speed of the respective wheel. According to a further embodiment, depending on the respective scaling values, it can be ascertained whether at least one of the wheels is a spare wheel. According to a further embodiment, depending on the respective scaling values, it can be determined whether at least one of the wheels has lost pressure.

According to another embodiment, an apparatus for operating a vehicle having a plurality of wheels and wheel sensors which are associated with said wheels and whose measurement signals are representative of angular speeds of the respective wheels, said apparatus may be designed—depending on the respective measurement signals, to register respective characteristic values for the angular speed of the respective wheel, —to transform the characteristic values into a common reference coordinates system of the vehicle depending on at least one of steering angle or yaw rate, —to determine a common reference value depending on the transformed characteristic values, —to determine respective intermediate scaling values depending on the respective ratio of the transformed characteristic values and of the reference value, —to adapt respective scaling values depending on the intermediate scaling values when a predefined condition is met, said condition being dependent upon the yaw rate and/or the steering angle LW.

BRIEF DESCRIPTION OF THE DRAWINGS

Exemplary embodiments are explained in greater detail below on the basis of the schematic drawings.

In the diagrams,

FIG. 2 is a program for operating a vehicle,

FIG. 1A is a schematic diagram showing a vehicle 1 with a control device 2, which may also be called an apparatus for operating the vehicle 1.

DETAILED DESCRIPTION

Figure 1A:
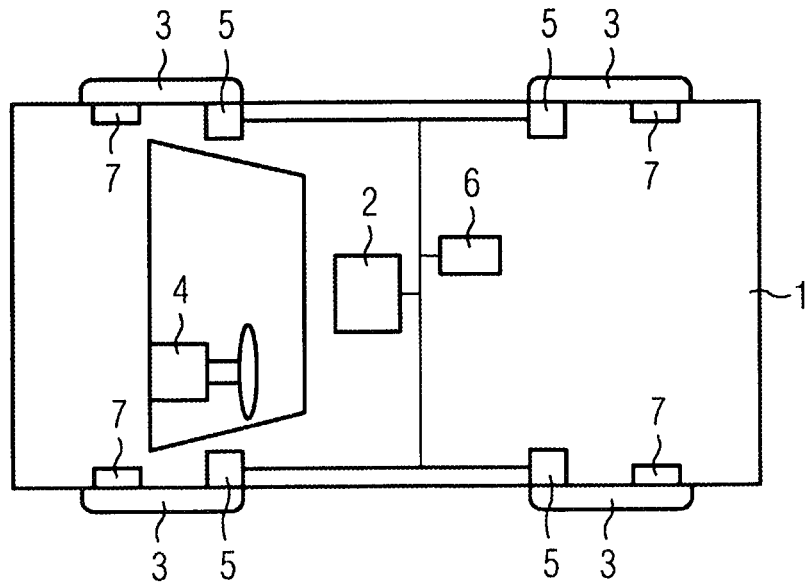
FIG. 1A shows a vehicle with an apparatus for operating the vehicle.

According to various embodiments, in a method and a corresponding apparatus for operating a vehicle having a plurality of wheels and wheel sensors which are associated with said wheels and whose measurement signals are representative of angular speeds of the respective wheels, depending on the respective measurement signals, respective characteristic values are registered for the angular speed of the respective wheel and the characteristic values are transformed into a common reference coordinate system of the vehicle depending on at least one value out of steering angle or yaw rate. A common reference value is determined depending on the transformed characteristic values. Respective intermediate scaling values are determined depending on the respective ratio of the transformed characteristic values and of the reference value. Respective scaling values are adapted depending on the intermediate scaling values when a predefined condition is met, said condition being dependent upon the yaw rate and/or upon the steering angle.

The advantage of this is that respective scaling values are adapted for the respective wheels of the vehicle on the basis of characteristic values of the angular speeds of the respective wheels of the vehicle without the need for further variables to be determined. A further advantage is the low number of values that need to be adapted, namely just the scaling values. This is all irrespective of the type of vehicle and is equally suitable for a vehicle with front or rear-wheel drive, or even with four-wheel drive.

The respective scaling values are, advantageously, subject to greater adaptation depending on the respective intermediate scaling values, at the time of the vehicle start-up than after a predefined period following the vehicle start-up. This means that the respective intermediate scaling values that are determined just after the vehicle start-up are taken into account more significantly during the calculation of the scaling values. This enables, for example, a wheel change to be detected rapidly immediately after the vehicle start-up. The scaling values are, advantageously, continuously adapted in the further operation of the vehicle.

The transformed characteristic values for the angular speed of the respective wheel of the vehicle are advantageously low-pass filtered. The low-pass filtering takes into account the previously transformed characteristic values. A common reference value is determined depending on the low-pass filtered, transformed characteristic values. The low-pass filtered, transformed characteristic values can be determined relative to one another through the common reference value.

The respective intermediate scaling values are advantageously determined from the respective ratio of transformed characteristic values of the angular speed of the respective wheel and of the low-pass filtered common reference value. The respective intermediate scaling values are a measure of the deviations of the transformed characteristic values relative to one another. Through low-pass filtering of the reference values, individually determined reference values are determined taking into account previous reference values.

The respective intermediate scaling values are advantageously determined from the respective ratio of low-pass filtered, transformed characteristic values of the angular speed of the respective wheel and of the common low-pass filtered reference value. By using the low-pass filtered, transformed characteristic values of the angular speed of the respective wheel, individual characteristic values are taken into account in the calculation with reference to previously determined values. Through low-pass filtering of the reference values, individually determined reference values are determined taking into account previous reference values.

The reference coordinate system into which the respective characteristic values of the angular speeds of the respective wheel are transformed is, advantageously, a barycentric coordinates system of the vehicle. The choice of the barycentric coordinates system as the reference coordinates system enables the respective transformed characteristic values for the angular speed of the respective wheel to be easily calculated.

The scaling values are, advantageously, adapted depending on the intermediate scaling values when a predefined condition is met, said condition being that the yaw rate value is lower than a first threshold value. This condition is intended to enable the scaling values to be updated only for yaw rates that are low. If the yaw rate is greater than the first threshold value, the vehicle is potentially skidding.

The scaling values are, advantageously, adapted depending on the intermediate scaling values when the predefined condition is met, said condition being that the steering angle value is lower than a second threshold value. Updating of the scaling values should be avoided if the vehicle is in a driving status with wide steering angle. Such a driving status would be present if the vehicle were traveling around a tight bend in the road.

In an embodiment, respective scaled wheel speeds are determined for the wheels of the vehicle depending on the respective scaling values and the assigned characteristic values for the angular speed of the respective wheel. The scaled wheel speeds increase the accuracy of the calculation to determine the longitudinal speed of the vehicle.

It is advantageously determined, depending on the respective scaling values, whether at least one of the wheels of the vehicle is a spare wheel. The level of the scaling value alone is a sufficient indicator that a wheel has been changed. A spare wheel has different scaling values than a wheel previously mounted on the vehicle.

It is advantageously determined, depending on the respective scaling values, whether at least one of the wheels of the vehicle has lost pressure. The level of the scaling value alone is a sufficient indicator that the condition of the relevant vehicle wheel has changed.

The vehicle has four wheels 3 with four associated wheel sensors 5 and a steering wheel 4. The wheel sensors 5 are linked to the control device 2, for example via a connecting cable or a controller area network bus.

The control device 2 has a microcomputer and a memory for storing a program code. A program for operating the vehicle 1 is stored in the memory and is run by the microcomputer while the vehicle 1 is in operation.

The vehicle has a yaw rate sensor 6 and steering angle sensors 7 for the front/rear wheels of the vehicle. The yaw rate sensor 6 registers the yaw rate GR of the vehicle 1 and the steering angle sensors 7 register the steering angle LW of the respective wheel. See also FIG. 1B.

The measurement signals registered by the yaw rate sensor 6 and by the steering angle sensors 7 of the front/rear wheels are forwarded to the control device 2. The yaw rate sensor 6 is ideally positioned in the barycentric coordinates system of the vehicle 1.

The measurement signals of the wheel sensors 3 are representative of the angular speeds of the wheels 3 of the vehicle 1. The control device 2 is designed for the purpose of registering characteristic values V1, V2, H1, H2 for the angular speeds of the wheels 3, depending on the respective measurement signals. The wheel sensors 5 are, for example, wheel-speed sensors and the characteristic values V1, V2, H1, H2 correspond, for example, to the rotational speeds.

The control device 2 is designed to transform the characteristic values V1, V2, H1, H2 for the angular speeds of the wheels 3 of the vehicle 1 into a common reference coordinates system and to determine a common reference value BW.

Intermediate scaling values ZV1, ZV2, ZH1, ZH2 are determined from the transformed characteristic values TV1, TV2, TH1, TH2 and from the common reference value BW. Scaling values SV1, SV2, SH1, SH2 are adapted individually for each wheel 3 depending on the intermediate scaling values ZV1, ZV2, ZH1, ZH2, if predefined conditions are met.

Predefined conditions are met when the yaw rate GR measured by the yaw rate sensor 6 is low, which means—for example—that the vehicle 1 is not skidding, in which case the level of the yaw rate GR would be high. If the vehicle travels around a banked bend, the value of the yaw rate GR registered by the yaw rate sensor 6 would be high, so that the predefined conditions are not met.

A normal operating status of the vehicle 1 is also present if the vehicle 1 is in a normal operating status in which the value of the steering angle LW which is registered by the steering angle sensors 7, is low. A normal operating status is not present, for example, when the vehicle 1 is traveling around a bend. In this case the values of the steering angles LW registered by the steering angle sensors 7 are high.

The scaling values SV1, SV2, SH1, SH2 make it possible, firstly, for a change of wheel or use of a spare wheel to be detected. Furthermore, by using the scaling values SV1, SV2, SH1, SH2 it is possible more accurately to determine a longitudinal speed of the vehicle 1.

Figure 1B:
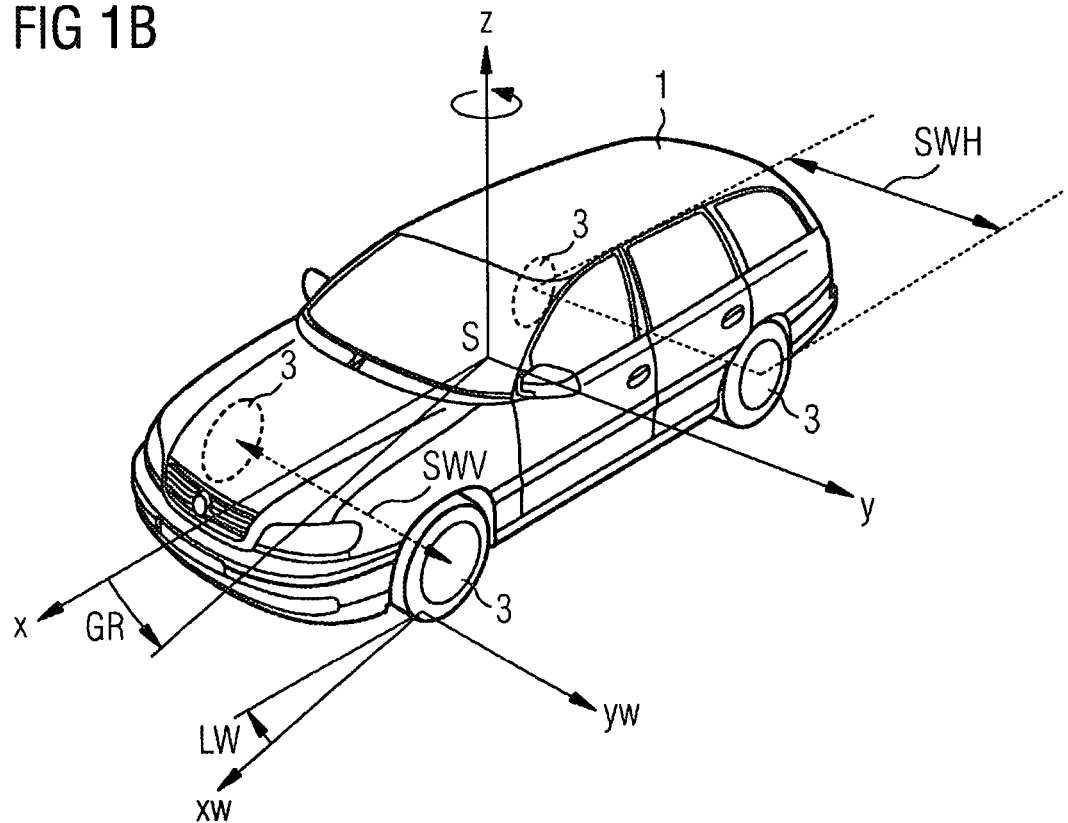
FIG. 1B is a perspective view of the vehicle.

FIG. 1B shows a perspective view of the vehicle 1 from FIG. 1A. The barycentric coordinates system of the vehicle 1 incorporates a center of gravity S and a coordinates system for the longitudinal axis x, the transverse axis y and the vertical axis z of the vehicle 1. The vehicle 1 moves in the direction of the positive longitudinal axis x, to which the longitudinal speed of the vehicle 1 also refers. The yaw rate GR, which is registered by the yaw rate sensor 6, is a measure of the speed of rotation about the vertical axis z of the vehicle 1.

The wheels 3 of the vehicle 1 have a separate coordinates system with a longitudinal wheel axis xw and a transverse wheel axis yw. The steering angle LW is the angle between the longitudinal wheel axis xw and the longitudinal axis x of the vehicle 1.

The vehicle 1 is furthermore characterized by a front wheel track SWV and a rear wheel track SWH. The front wheel track SWV of the vehicle 1 is the distance between the wheel contact points of the two wheels 3 of a front vehicle axle. The rear wheel track SWH of the vehicle 1 is the distance between the wheel contact points of the two wheels 3 of a rear vehicle axle.

FIG. 2 shows a flow chart of a program for operating a vehicle 1. The program is stored in a program memory of an apparatus for operating the vehicle 1 and is run during operation of the vehicle 1.

The program is started in a stage S1 and run repeatedly during operation of the vehicle 1. In a stage S2 of the method, respective characteristic values V1, V2 are registered for the angular speed of the front wheels and respective characteristic values H1, H2 are registered for the angular speed of the rear wheels of the vehicle 1. In this exemplary embodiment the characteristic values V1, V2 for the angular speed of the front wheels and the characteristic values H1, H2 for the angular speed of the rear wheels correspond to the wheel speeds of the respective wheels 3 of the vehicle 1.

In a stage S3 the characteristic values V1, V2, H1, H2 for the angular speed of the front wheels or of the rear wheels are transformed into a common reference coordinates system of the vehicle 1. The common reference coordinates system is, for example, the barycentric coordinates system of the vehicle 1.

The transformation in stage S3 is different for the front and rear wheels of the vehicle 1. The transformed characteristic value TV1, TV2 for the respective front wheel of the vehicle 1 is a function of the characteristic value V1, V2 for the angular speed of the respective front wheel, of the steering angle LW of the front wheel and/or of the yaw rate GR and of the front wheel track SWV of the vehicle 1: $TV1=f(V1,LW,GR,SWV)=V1*\cos(LW)+/-\frac{1}{2}*SWV*GR$; $TV2=f(V2,LW,GR,SWV)=V2*\cos(LW)-/+\frac{1}{2}*SWV*GR$. The transformed characteristic value TV1, TV2 for the respective front wheel of the vehicle 1 is obtained by multiplying the characteristic value V1, V2 by the cosine of the steering angle LW of the respective front wheel and adding half of the front wheel track SWV of the vehicle 1 multiplied by the yaw rate GR.

The transformed characteristic value TH1, TH2 for the angular speed of the respective rear wheel of the vehicle 1 is a function of the characteristic value H1, H2 for the angular speed of the respective rear wheel, of the yaw rate GR and of the rear wheel track SWH of the vehicle 1: $TH1=f(H1,GR,SWH)=H1+/-\frac{1}{2}*SWH*GR$; $TH2=f(H2,GR,SWH)=H2-/+\frac{1}{2}*SWH*GR$. The steering angle LW is not taken into account in the calculation of the transformed characteristic values TH1, TH2 for the angular speed of the respective rear wheel of the vehicle 1, because the rear wheels are not steered in this exemplary embodiment. If, for example, steering is provided to the rear wheels of the vehicle 1, the steering angle LW of the rear wheel is taken into account. Thus, for calculation of the transformed characteristic value TH1, TH2 for the angular speed of the respective rear wheel of the vehicle 1, this results in a sum of the characteristic value H1, H2 for the angular speed of the respective rear wheel and half of the rear wheel track SWH, which is multiplied by the yaw rate GR.

A common reference value BW is determined from the transformed wheel speeds TV1, TV2, TH1, TH2 in a stage S4.

In a stage S5, respective intermediate scaling values ZV1, ZV2, ZH1, ZH2 are determined for each wheel 3. The intermediate scaling values ZV1, ZV2, ZH1, ZH2 for the respective wheels 3 are dependent on the respective ratio of the assigned transformed characteristic values TV1, TV2, TH1, TH2 and the common reference value BW. For example, the scaling value ZV1 is equal to the ratio formed from the transformed characteristic value TV1 to the common reference value BW.

In a further stage S6 it is ascertained whether predefined conditions are met. One predefined condition is met if the value of the yaw rate GR of the vehicle 1 is lower than a first threshold value THD1. In this stage it is also possible to check whether the value of the steering angle LW is lower than a second threshold value, or both the yaw rate GR and the steering angle LW can be checked to ascertain whether they are lower than a first and second threshold value respectively.

If it is ascertained, in stage S6, that the predefined condition is met, the scaling values SV1, SV2, SH1, SH2 are adapted in a stage S7 depending on the previously determined intermediate scaling values ZV1, ZV2, ZH1, ZH2. For example, the scaling values SV1, SV2, SH1, SH2 are adapted by means of sliding averaging, in which—depending on a weighting value to be selected—a scaling value SV1, SV2, SH1, SH2 is adapted, taking into consideration the assigned intermediate scaling value ZV1, ZV2, ZH1, ZH2 in each case.

If the vehicle 1 has just started up, the scaling values SV1, SV2, SH1, SH2 are subject to greater adaptation than after a predefined period following the vehicle start-up. This enables, for example, a wheel change or use of a spare wheel to be detected very soon after the vehicle start-up.

If it is ascertained in stage S6 that the predefined condition is not met, the scaling values SV1, SV2, SH1, SH2 are not updated and execution of the program starts again with registration of the characteristic values V1, V2, H1, H2 for the angular speed of the respective wheel 3 in stage S2 of the flow chart.

The check to ascertain whether the yaw rate GR or the steering angle LW is lower than a first threshold value THD1 or a second threshold value respectively, prevents the scaling values SV1, SV2, SH1, SH2 from being determined if the vehicle 1 is in a particular type of vehicle handling. This may occur, for example, if the vehicle 1 is traveling around a tight bend and the yaw rate GR and the steering angle LW have comparatively high values. If, for example, the vehicle 1 is skidding with high yaw rate GR, a particular vehicle handling is present and adaptation of the scaling values SV1, SV2, SH1, SH2 should not take place.

The program is preferably repeated until a vehicle stop FS is detected in a stage S8. When a vehicle stops, the program terminates in a stage S9.

If the transformed wheel speeds TV1, TV2, TH1, TH2 are determined in stage S3 and/or the common reference value BW is determined in stage S4 and/or the intermediate scaling values ZV1, ZV2, ZH1, ZH2 are determined in stage S5, these values are preferably low-pass filtered. This may be done, for example, by means of sliding averaging, in which the mean value is recalculated with each execution depending on a weighting value a to be selected.

If G is the variable to be averaged, and MVA the mean value in a previous execution, then the mean value is $MV=a*MVA+(1-a)*G$. By selecting the weighting value a, the mean value MV of the variable G to be averaged can be changed to a greater or lesser extent with continued execution of the method.

Figure 3:
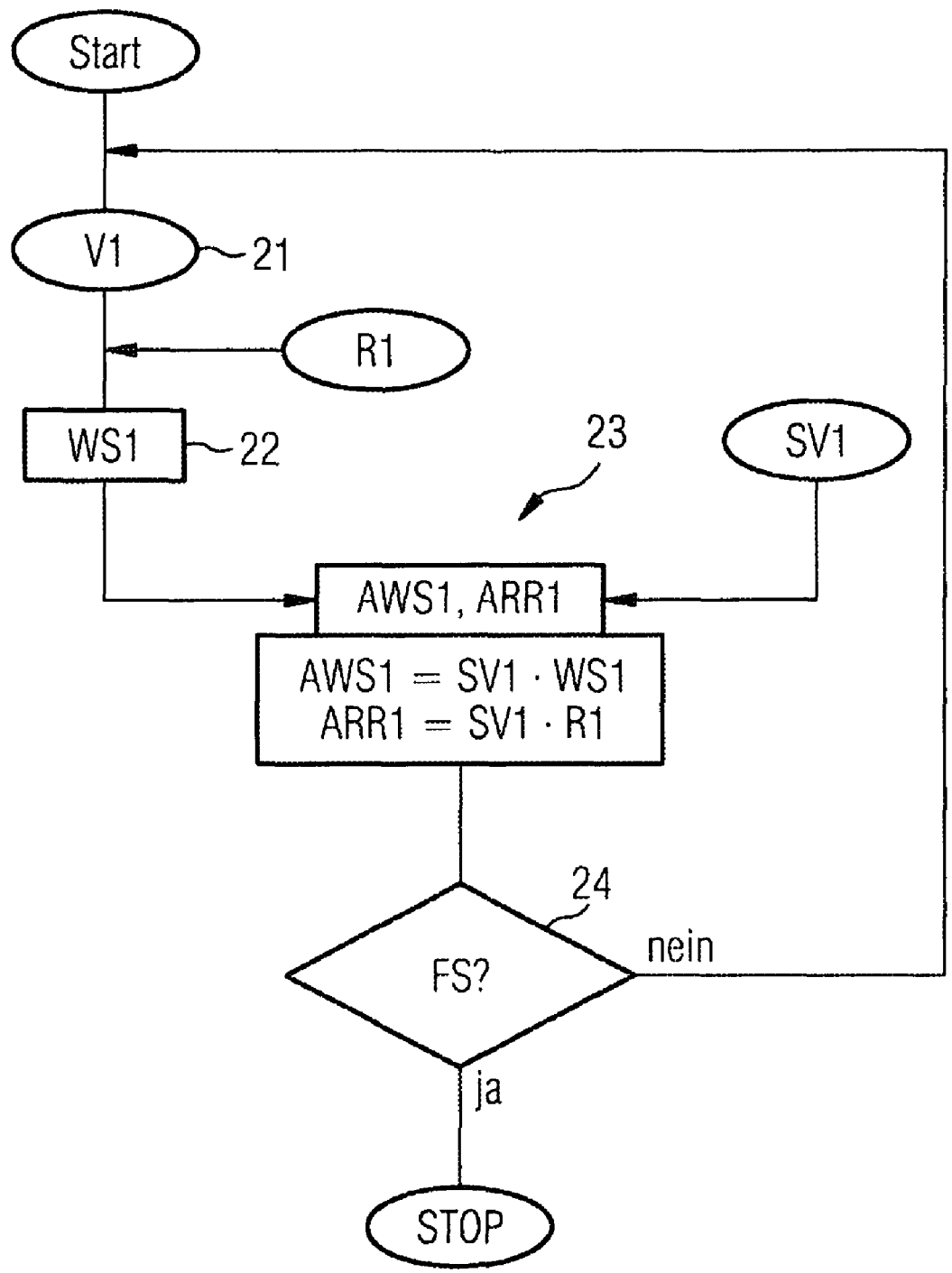
FIG. 3 is a further program for operating the vehicle.

FIG. 3 is a flow chart showing a further program for operating the vehicle 1. This further program is provided for operating a vehicle 1 having a plurality of wheels 3 and is preferably executed in a manner virtually parallel to the first program.

In this exemplary embodiment the scaling values SV1, SV2, SH1, SH2 are adapted for the four wheels 3 of the vehicle 1 as in the first exemplary embodiment. For the sake of simplification the execution of the program is explained in detail for only one wheel 3 of the vehicle 1. The execution with regard to the other wheels 3 of the vehicle 1, however, corresponds to this one.

In a stage 21 a characteristic value V1 is registered for the angular speed of the wheel 3. In a stage 22, a wheel speed WS1 of the wheel 3 is determined by multiplying the characteristic value V1 by an accepted reference radius R1 of the wheel 3.

In a stage 23, the determined wheel speed WS1 is multiplied by the scaling value SV1. Two variables are determined from the product: an adapted relative wheel speed AWS1 and an adapted relative wheel radius ARR1.

In a stage 24, a check is carried out to ascertain whether the vehicle has stopped FS. If the vehicle has not stopped FS the program is repeated, starting with registration of the characteristic value V1 for the angular speed of the wheel 3, in stage 21. If the vehicle stops, the program is terminated.

The accuracy of the determination of the longitudinal speed of the vehicle 1 may be increased on the basis of the adapted relative wheel speed AWS1 or of the adapted relative wheel radii ARR1 for all wheels 3 of the vehicle 1. For this purpose it is necessary for the wheel radii R1 of all wheels 3 of the vehicle 1 to be adapted individually.

Furthermore, it is possible to ascertain—on the basis of the adapted relative wheel radii ARR1—whether loss of pressure has occurred in the case of at least one of the wheels 3. This information may be forwarded to a user of the vehicle 1, for example the driver. Any wear in the tires of the wheels 3 of the vehicle 1 may, for example, also be determined by a change in the adapted relative wheel radius ARR1.

Further exemplary embodiments of the invention are not explained in greater detail here, but are covered by the invention.

What is claimed is:

1. A method for operating a vehicle having a plurality of wheels and wheel sensors which are associated with said wheels and whose measurement signals are representative of angular speeds of the respective wheels, the method comprising:

registering respective characteristic values for the angular speed of the respective wheel depending on the respective measurement signals, transforming the characteristic values in a common reference coordinates system of the vehicle depending on at least one of steering angle or yaw rate, determining a common reference value depending on the transformed characteristic values, determining respective intermediate scaling values depending on the respective ratio of the transformed characteristic values and the reference value, adapting respective scaling values depending on the intermediate scaling values when a predefined condition, which is dependent upon at least one of the yaw rate and upon the steering angle, is met.

2. The method according to claim 1, wherein
the respective scaling values, depending on the respective intermediate scaling values, are subject to greater adaptation at the time of a vehicle start-up than after a predefined period following the vehicle start-up.

3. The method according to claim 1, wherein
the transformed characteristic values for the angular speed of the respective wheel are low-pass filtered and the common reference value is determined depending on the low-pass filtered, transformed characteristic values.

4. The method according to claim 1, wherein
the common reference values are low-pass filtered and respective intermediate scaling values are determined depending on the respective ratio of the transformed characteristic values for the angular speed of the respective wheel and of the low-pass filtered reference value.

5. The method according to claim 1, wherein
the common reference values are low-pass filtered and respective intermediate scaling values are determined depending on the respective ratio of the low-pass filtered, transformed characteristic values and of the low-pass filtered reference value.

6. The method according to claim 1, wherein
the reference coordinates system of the vehicle is a barycentric coordinates system of the vehicle.

7. The method according to claim 1, wherein
the predefined condition is met when the yaw rate of the vehicle is lower than a predefined first threshold value.

8. The method according to claim 1, wherein
the predefined conditions are met when the steering angle of the vehicle is lower than a predefined second threshold value.

9. The method according to claim 1, wherein
a scaled wheel speed is determined depending on the respective scaling value and on the assigned characteristic value for the angular speed of the respective wheel.

10. The method according to claim 1, wherein,
depending on the respective scaling values, it is ascertained whether at least one of the wheels is a spare wheel.

11. The method according to claim 1, wherein,
depending on the respective scaling values, it is determined whether at least one of the wheels has lost pressure.

12. An apparatus for operating a vehicle having a plurality of wheels and wheel sensors which are associated with said wheels and whose measurement signals are representative of angular speeds of the respective wheels, said apparatus being operable
- to register respective characteristic values for the angular speed of the respective wheel depending on the respective measurement signals,
- to transform the characteristic values into a common reference coordinates system of the vehicle depending on at least one of steering angle or yaw rate,
- to determine a common reference value depending on the transformed characteristic values,
- to determine respective intermediate scaling values depending on the respective ratio of the transformed characteristic values and of the reference value, and
- to adapt respective scaling values depending on the intermediate scaling values when a predefined condition is met, said condition being dependent upon the yaw rate and/or the steering angle LW.

13. The apparatus according to claim 12, wherein the respective scaling values, depending on the respective intermediate scaling values, are subject to greater adaptation at the time of a vehicle start-up than after a predefined period following the vehicle start-up.

14. The apparatus according to claim 12, wherein the transformed characteristic values for the angular speed of the respective wheel are low-pass filtered and the common reference value is determined depending on the low-pass filtered, transformed characteristic values.

15. The apparatus according to claim 12, wherein the common reference values are low-pass filtered and respective intermediate scaling values are determined depending on the respective ratio of the transformed characteristic values for the angular speed of the respective wheel and of the low-pass filtered reference value.

16. The apparatus according to claim 12, wherein the common reference values are low-pass filtered and respective intermediate scaling values are determined depending on the respective ratio of the low-pass filtered, transformed characteristic values and of the low-pass filtered reference value.

17. The apparatus according to claim 12, wherein the reference coordinates system of the vehicle is a barycentric coordinates system of the vehicle.

18. The apparatus according to claim 12, wherein the predefined condition is met when the yaw rate of the vehicle is lower than a predefined first threshold value.

19. The apparatus according to claim 12, wherein the predefined conditions are met when the steering angle of the vehicle is lower than a predefined second threshold value.

20. The apparatus according to claim 12, wherein a scaled wheel speed is determined depending on the respective scaling value and on the assigned characteristic value for the angular speed of the respective wheel.

* * * * *